No. 815,369. PATENTED MAR. 20, 1906.
E. A. & A. B. MUNRO.
CEILING PLATE.
APPLICATION FILED FEB. 1, 1905.

WITNESSES:

Edgar M. Greenbaum

P. W. Becker Jr.

INVENTORS
Edward A. Munro,
Arthur B. Munro,
BY
Emil F. Gummert
ATTORNEY.

UNITED STATES PATENT OFFICE.

EDWARD A. MUNRO AND ARTHUR B. MUNRO, OF NEW YORK, N. Y.

CEILING-PLATE.

No. 815,369.  Specification of Letters Patent.  Patented March 20, 1906.

Application filed February 1, 1905. Serial No. 243,707.

*To all whom it may concern:*

Be it known that we, EDWARD A. MUNRO and ARTHUR B. MUNRO, citizens of the United States, residing at Brooklyn borough, New York city, county of Kings, and State of New York, have invented a new and useful Improvement in Ceiling-Plates, of which the following is a specification.

Our invention relates to improvements in ceiling-plates such as are used on radiator-risers or other pipes, and has for its object the production of a ceiling-plate which, while covering or concealing the hole in the ceiling, will conform to the contour of the surrounding plaster through which it passes, the plates being either of a pretetermined shape or made of flexible metal, such as lead or any suitable metal or material which can be formed into shape at the place where it is used.

The accompanying drawings, which form part of this specification, show our invention.

Figure 1:
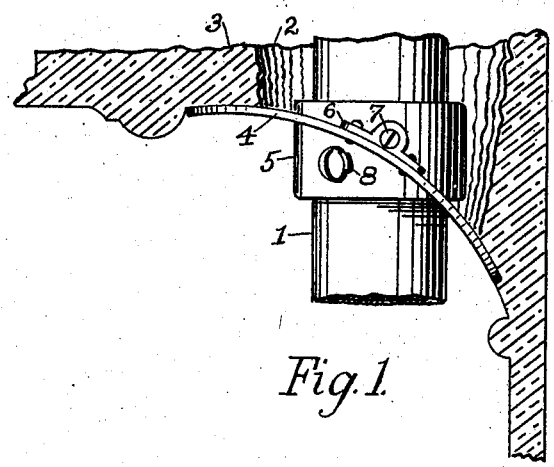
Figure 2:
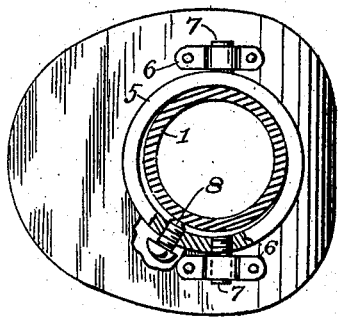
Figure 3:
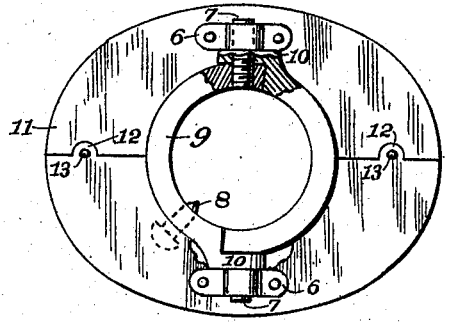
Figure 4:
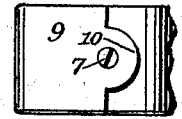

Figure 1 is a side view of our improved ceiling-plate in position on a "riser," so called, the plaster being broken away. Fig. 2 is a plan view thereof, the collar and plate being partly broken away to show detail. Fig. 3 is a plan view of a modification, the collar and plate being split or divided to facilitate placing into position, also partly broken away. Fig. 4 is a side view of collar shown in Fig. 3 partly broken away.

Similar reference characters indicate similar parts in the several views.

1 is a steam or hot-water pipe.

2 is the usual opening in the ceiling 3.

The plate 4 is pivotally positioned on the slip-collar 5 by straps 6, which are riveted to the plate or otherwise secured.

7 represents lugs or trunnions on which the plate is pivoted. We show these lugs as having threaded ends, though they may be cast integral with collar or driven into place. The collar is held in position on the pipe by a pointed screw 8, which is screwed up tightly, so the collar will not slip or shift when the pipe expands or contracts.

The above description applies to Figs. 1 and 2, wherein the collar and plate are placed on the pipe during erection. Figs. 3 and 4 show a divided collar and plate, which can be positioned after the pipe is erected and all the connections are made. The collar 9 is made in halves, an ear 10 projecting circumferentially at the end and lapping over the end of its mate where it is fastened by the lug or screw 7. The plate 11 is also in halves, there being two or more ears 12 extending from the end, as shown, and lapping the joint. The two halves may be soldered or fastened together by a rivet 13 or in any preferred manner.

If the decorations, contour of coves, or other members in cornices of a large number of rooms are similar—say in a hotel or office-building—then we prefer to make the plates of cast or sheet metal of a predetermined shape to suit the cornice where they are to be used. If, however, the members of the cornice or cove are of such a number as to make a fanciful pattern, where few plates are to be used or where the opening in the ceiling is accidentally large we prefer to use a plate of yielding or flexible metal or material which can easily be formed by manipulating into the desired outline and made to match "at the job."

The operation, which has partly been described above, is as follows: When the ceiling-plate is used in erecting, the collar and plate are slipped over the riser in the usual way and pushed up into position, the swiveling plate being easily turned or pivoted to suit. The hole in the plate around the collar can be filed out, if required, or the plate can be cut or made suitable for the position into which it is put. If the plate and collar are to be positioned after the work is erected, then the split collar is placed on the pipe, the two halves of the ceiling-plate are placed on collar, and the complete device is pushed up into its place, the shaping being done in the same manner as when a solid plate is used. In either case the lugs or trunnions being placed at diametrically opposite sides of the collar the plate can be pivoted so that the angle relative to the riser can be changed at will.

Such being a full description of our invention, what we claim as new is—

1. In a ceiling-plate, the combination of a collar adapted to be secured about a pipe and a flexible plate pivotally attached to said collar, the pivots being so located that the angle between the plate and the collar may be varied by the movement of either with respect to the other about said pivots.

2. In a ceiling-plate provided with an opening adapted to receive a pipe, the combination of a divided collar adapted to be secured about said pipe, and a divided plate pivotally attached to said collar, the pivots being so located that the angle between the plate and the collar may be varied by the movement of either with respect to the other about said pivots, substantially as described.

In testimony whereof we have signed our names to this specification, in the presence of two subscribing witnesses, this 27th day of January, 1905.

EDWARD A. MUNRO.
ARTHUR B. MUNRO.

Witnesses:
R. W. ROBINSON,
EDGAR M. GREENBAUM.